March 13, 1962 L. A. MILLS 3,024,491
SKINNING APPARATUS
Filed July 13, 1959 2 Sheets-Sheet 1
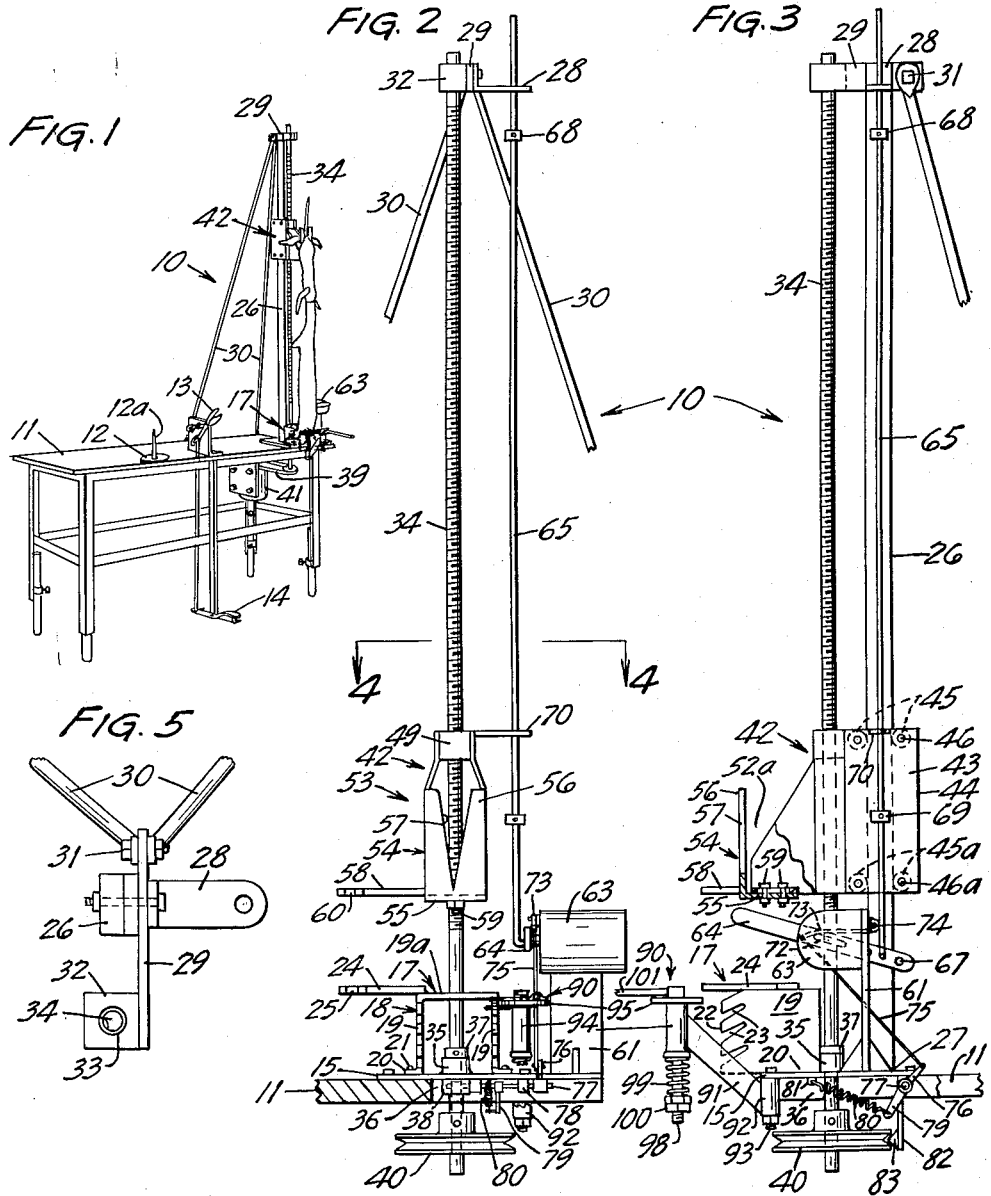
INVENTOR
LESTER A. MILLS
BY
Williamson, Schroeder & Palmatier
ATTORNEYS March 13, 1962 L. A. MILLS 3,024,491
SKINNING APPARATUS
Filed July 13, 1959 2 Sheets-Sheet 2

INVENTOR
LESTER A. MILLS
BY
Williamson, Schroeder & Palmatier
ATTORNEYS

United States Patent Office 3,024,491
Patented Mar. 13, 1962

3,024,491
SKINNING APPARATUS
Lester A. Mills, Paynesville, Minn.
Filed July 13, 1959, Ser. No. 826,542
12 Claims. (Cl. 17—21)

This invention relates to skinning apparatus and more specifically to apparatus for removing pelts from animals.

One of the existing problems in the fur industry has been the loss of time incurred during the skinning or pelt-removing operation. Heretofore, this pelt removing operation was done manually and involved a time-consuming and tedious process. There are no known mechanical pelt-removing devices for efficiently and rapidly removing the pelts from animals.

It is therefore contemplated as a general object of my invention to provide a novel skinning apparatus, of simple and inexpensive construction, for mechanically removing pelts from the carcasses of animals.

Another object of my invention is to provide a novel skinning apparatus having means for gripping and mechanically pulling the carcass of an animal away from carcass-detached end portions of a pelt for removing the carcass from the pelt.

A still more specific object of my invention is to provide a novel power-operated skinning apparatus arranged and constructed for gripping and mechanically pulling the carcass of an animal away from anchored end portions of a pelt for removing the same from the pelt.

These and other objects and advantages of this invention will more fully appear from the following description made in connection with the accompanying drawings, wherein like reference characters refer to the same or similar parts throughout the several views, and in which:

FIG. 1 is a view in perspective of my novel skinning apparatus during operation thereof and showing a pelt partially removed from an animal carcass;

FIG. 2 is an enlarged front elevational view of the novel skinning apparatus;

FIG. 3 is a side elevational view of my novel skinning apparatus with certain parts broken away to better show hidden structure;

FIG. 5 is a top plan view on an enlarged scale of the upper end of my novel skinning apparatus.

Figure 4:
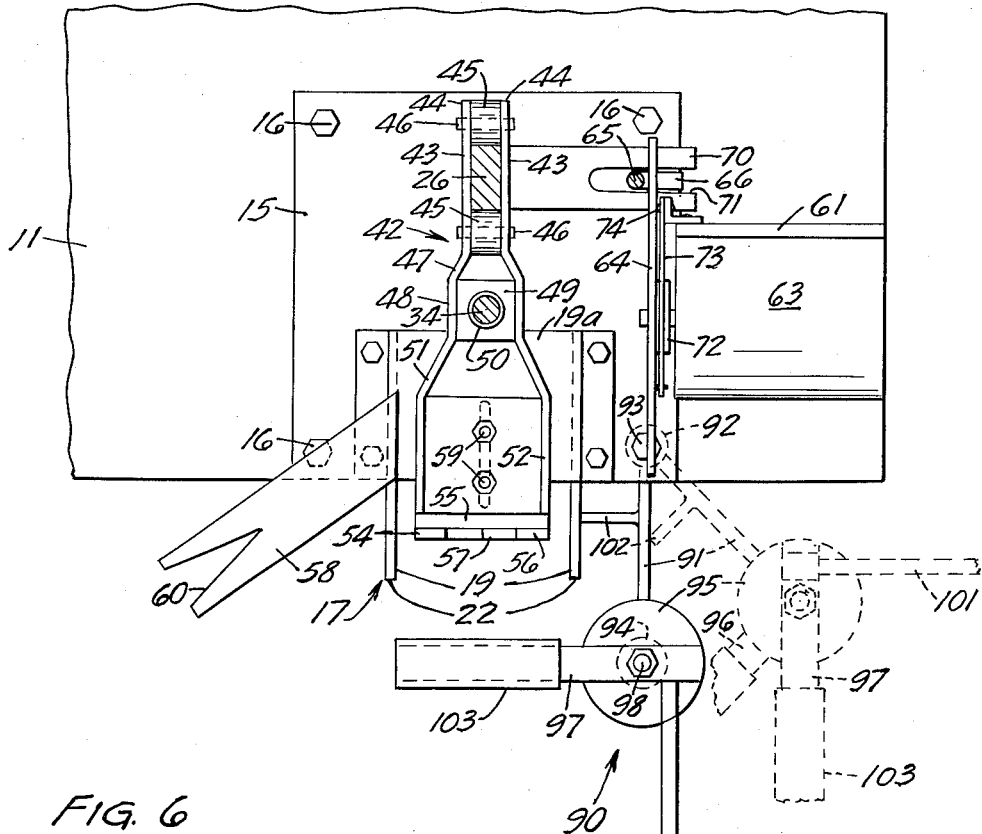
FIG. 4 is a horizontal section taken on line 4—4 of FIG. 2 on an enlarged scale and looking in the direction of the arrows.

Referring now to the drawings and specifically to FIG. 1, the novel skinning apparatus is generally disignated 10 and is adapted to be secured to a table 11 which may be provided with conventional adjustable legs for adjusting the height thereof. Table 11 may be elongated, as shown in FIG. 1, in order to permit several tools to be mounted thereon which are used to prepare the animal for the pelt-removing operation performed by my novel skinning apparatus 10.

To preliminarily prepare an animal, such as a mink or the like, for the pelt-removing operation, an incision is made along the inner or posterior side of the rear leg. This incision extends from a point adjacent the posterior portion of one paw and extends upwardly along the posterior portion of the leg, across the posterior portion or torso of the animal dwnwardly along the inner or posterior portion of the other leg to terminate at a point adjacent the posterior portion of the other paw. Thus a single incision is formed along the posterior side of the legs of the animal and extends from a point adjacent one rear paw to the other rear paw.

A separating tool 12 may be secured to table 11 and includes an upstanding elongated pointed member 12a which functions to separate the pelt of the animal from the leg portions of the carcass. This is done by forcing the incised leg portions of the animal against the elongated pointed element 12a at a point along the incision so that the elongated element 12a penetrates beneath the skin of the rear leg of the animal. By moving the leg of the animal around the upstanding member 12a, the connective tissues between the skin and muscles are separated to thereby separate the pelt from the legs of the animal.

The next step in the preliminary preparation of the animal is severing the legs of the animal adjacent the paw so that the pelt leg portion of the animal is completely detached from the legs. The legs are severed at points adjacent the paws so that the paws remain with the carcass-detached pelt portion and this operation is accomplished by a clipper assembly 13 which may be mounted to the table 11 and which may be operated by a conventional foot pedal 14 so that the operator's hands are left free to hold and manipulate the animal.

Referring now to FIGS. 2, 3 and 4, it will be seen that the skinning apparatus 10 includes a substantially rectangular flat base plate 15 which is secured to table 11 by any conventional means such as bolts 16. A pelt-end retaining mechanism designated 17 is, in the embodiment shown, in the form of an inverted channel member 18 which has a pair of depending legs 19 and web portion 19a. The depending legs 19 are provided at their lower ends with horizontally extending attachment flanges 20 which are secured to base plate 15 by means of bolts 21. The front or leading edges 22 of legs 19 are provided with a plurality of rearwardly and upwardly extending recesses or notches 23 which function to retain the carcass-detached portion of the pelt adjacent the paws therein.

Pelt-end retaining mechanism 17 is also provided with a retaining member 24 in the form of an elongated flat plate which is secured to the pelt-end retaining mechanism by any conventional means such as bolts or the like. Retaining member 24 is also provided with a V-shaped recess or notch 25 for receiving a carcass-detached portion of the pelt adjacent the caudal appendage of the animal therein. As shown in FIGS. 2 and 4, retaining member 24 is disposed substantially parallel to base plate 15 and extends forwardly and laterally from the pelt-end retaining mechanism.

Figure 6:
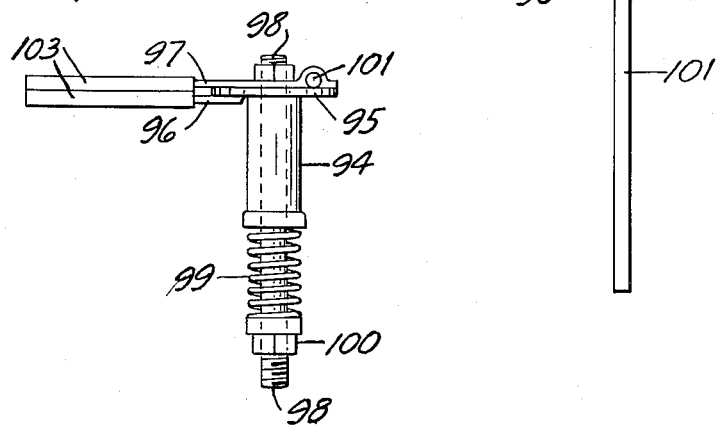
FIG. 6 is a side elevational view on an enlarged scale of the clamping means for clamping the caudal appendage of a pelt.

It has been found that occasionally the carcass-detached portions of the pelt adjacent the paws separate during the skinning operation when subjected to tension stresses. I have, therefore, provided a clamping means 90, as shown in FIGS. 3, 4 and 6, which cooperate with the pelt-end retaining mechanism for retaining a part of the carcass-detached portion of the pelt during the skinning operation. Referring now to FIGS. 4 and 6, it will be seen that clamping means 90 includes an elongated arm 91 having a sleeve 92 at one end thereof secured to plate 15 by a vertical pivot pin 93 which permits swinging movement of arm 91. It will be noted from FIG. 3 that elongated arm 91 is somewhat inclined relative to plate 15 and has another sleeve 94 secured to its outer end. A circular plate 95 is fixed to the upper end of sleeve 94 and has a clamping arm 96 rigidly fixed thereto and extending radially therefrom. Another clamping arm is pivotally mounted on plate 95 by pin 98 which permits horizontal swinging of arm 97 about a vertical axis. A coil spring 99 is disposed around the lower end of pin 98 and its end convolutions bear against the lower end of sleeve 94 and a lock nut 100 whereby arm 97 is constantly urged downwardly against plate 95. A handle 101 is secured to one end of arm 97 adjacent pivot pin 98 and functions as a means for swinging the entire clamping assembly 92 into and out of a position of use and further functions as a means for swinging clamping arm 97 into and out of clamping relation with clamping arm 96.

Referring now to FIG. 4, it will be noted that elongated arm 91 is provided with a laterally extending stop plate 102 which engages leg 19 of channel member 18 when clamping assembly 90 is swung into operative position immediately adjacent the pelt-end retaining mechanism 17. The dotted lines in FIG. 4 indicate the inoperative position of clamping assembly 90 and also indicate the position of clamping arm 97 when the same is moved out of clamping relation with clamping arm 96. Clamping arms 96 and 97 are each provided with a cover sleeve 103 formed of pliable material, such as rubber, so that the tail or caudal portion of the pelt may be clamped between arms 96 and 97 without any danger of the pelt being damaged by shearing or cutting.

The caudal or tail portion of the pelt is wound or wrapped around clamping arm 96 and clamping arm 97 is thereafter swung into clamping relation therewith whereby the carcass-detached portion of the pelt is secured by both paw portions to the pelt-end retaining mechanism 17 and the caudal portion of the pelt, of course, is secured to clamping assembly 90. It will be apparent that with the pelt retained in this manner there will be little danger of severe damage to the pelt even if one of the paw portions thereof becomes separated. Clamping assembly 90 also permits the tail portion of the pelt to absorb some of the tension stresses when the machine or apparatus is in operation.

An upstanding elongated member or track bar 26 is secured to base plate 15 as at 27 by welding the same thereto and has a bracket 29 secured at the upper end thereof. Bracket 29 is in the form of a transversely extending elongated bar and provides a means of attachment for the flattened upper ends of a pair of elongated braces 30 as at 31. The opposite ends of braces 30 are secured to table 11 and function to brace skinning apparatus 10 against tilting. A laterally extending angle bracket 28 having an opening therein, is secured to bracket 29, the function of which will be described later.

The other end of bracket 29 has a bearing 32 rigidly secured thereto which is provided with an opening or bore 33 for receiving the upper end of an upstanding threaded actuating element or screw 34. The lower end portion of the actuating screw 34 extends through an upstanding boss or thrust bearing 35 which is in turn rigidly secured to base plate 15. The lower end of actuating screw 34 extends through an opening 36 formed in table 11 and terminates at a point therebelow. A pair of collars 37 and 38 are keyed or fixed to actuating screw 34 and are disposed on opposite ends of thrust bearing 35 and function to prevent axial movement of the actuating screw 34.

Skinning apparatus 10 is provided with a power means 41 for rotating actuating screw 34 and, in the embodiment shown, comprises a reversible electric motor having a conventional gear reduction mechanism. Power means 41 is provided with a drive shaft having a pulley fixed thereto (not shown). A belt 39 is trained over the drive shaft pulley and is also trained over a pulley 40 keyed to the lower end of actuating screw 34. Thus actuating screw 34 is drivingly connected to power means 41 whereby upon energization of said power means the actuating screw 34 will be rotated.

A carriage 42 is shiftably mounted on elongated member 26 and includes a pair of vertically disposed spaced plates 43. Referring now to FIG. 4, it will be seen that rear portions 44 of plates 43 are disposed in closely spaced parallel relation and are positioned adjacent opposite side wall portions of track bar 26. A pair of longitudinally spaced upper rollers 45 are disposed in rollable engagement with the front and rear sides of track bar 26 and are rotatably secured to rear portions 44 by pins 46. A pair of longitudinally spaced lower rollers 45a rollably engage the front and rear sides of track bar 26 and secured to rear portions 44 by pins 46a. Rollers 45a, as shown in FIG. 3, are vertically spaced from rollers 45 and the two pairs of rollers function to permit vertically sliding movement of carriage 42 on bar 26.

Plates 43, as seen in FIG. 4, include intermediate offset portions 47 and intermediate parallel portions 48. A screw engaging element 49 is disposed between and fixedly secured to parallel portions 48. Screw engaging element 49 is provided with a bore 50 for receiving an engaging actuating screw 34 in cooperating relationship thereto. Bore 50 may be threaded but in the preferred embodiment a plurality of ball elements (not shown) are disposed therein for engaging actuating screw 34 where by a friction reducing engagement is effected. Rotation of actuating screw 34 causes carriage 42 to move in a vertical direction and actuating screw 34 will, of course, further serve to guide carriage 42 during its vertical movement thereon.

Plates 43 also include intermediate offset portions 51 which terminate forwardly in front portions 52 which are disposed in substantially parallel relation. A carcass-gripping mechanism generally designated 53 is comprised of front portions 52 and an angle member 54. The horizontally disposed leg 55 of angle member 54 is welded to the lower edges of front portion 52 and the upper leg 56 has a V-shaped notch 57 formed therein. Referring now to FIG. 3, it will be noted that the leading edges of front portions 52 are inclined and together with upper leg 56 of angle member 54 define a notched-like recess 52a for receiving the leg portions of an animal carcass therein. The pelt-exposed hip portions of the animal carcass are wedged into V-shaped notch 57 whereby the animal carcass is secured to carriage 42 as shown in FIG. 1 of the drawings.

Carcass-gripping mechanism 53 also includes a carcass-gripping member 58 in the form of an elongated flat plate which is secured to angle leg 56 as at 59 by bolts or the like. It will also be seen that gripping member 58 extends forwardly and laterally and is disposed substantially parallel with retaining member 24. A V-shaped recess or notch 60 is formed at one end of carcass-gripping member 58 and is disposed in registering relation with the V-shaped recess 25 formed in retaining member 24 when the respective gripping members are disposed in abutting or closely adjacent relationship. Gripping member 58 is adapted to grip the pelt-exposed portion of the carcass adjacent the tail or caudal appendage and when the carriage is moved away from the retaining member 24, the caudal appendage is removed from the pelt portion thereof.

Referring now to FIGS. 2 and 3, it will be seen that base plate 15 is provided with an upstanding laterally extending plate 61 which provides a mounting for a double-throw switch mechanism 63 for controlling operation of the electric power means 41. Although not shown in the drawings, switch mechanism 63, of course, will be connected to an electrical source of power for supplying electrical current to electric motor 41. Switch mechanism 63 includes a switch lever 64 which is selectively movable to energize reversible electric power means 41 whereby actuating screw 34 is rotated in a direction to move carriage 42 upwardly or is rotated in a direction to move carriage 42 downwardly on elongated member 26. When switch lever 64 is in the position shown in FIG. 3 actuating screw 34 is rotated in a direction to move carriage 42 upwardly and when switch lever 64 is pivoted in a counterclockwise direction the carriage 42 will move vertically downwardly. Electric motor 41 will be de-energized for stopping operation of the skinning apparatus when the switch lever 64 is in the neutral or substantially horizontal position.

Automatic control means are provided to limit vertical movement of carriage 42 on elongated member 26 and include an elongated vertically disposed switch control rod 65 having its upper end slidably received within bracket 28 and having an offset lower end 66 which is inserted in one of a plurality of openings 67 formed in switch lever 64. Switch control rod 65 is provided with an upper stop member 68 and a lower stop member 69 adjacent its respective upper and lower ends. An actuating bar 70 is rigidly secured to carriage 42 and is provided with a recess or notch 71, as shown in FIG. 4. Switch control rod 65 is positioned within the recess or notch 71 but in non-engaging relation thereto, as seen in FIG. 4, and it will be seen that upward movement of carriage 42 beyond a predetermined point will cause the actuating bar 70 to engage the upper stop member 68 to thereby pivot switch lever 64 in a counterclockwise direction until it assumes a horizontal or neutral position wherein the power means 41 is thereby de-energized. In a like manner downward movement of carriage 42 beyond a predetermined point will cause actuating bar 70 to engage the lower stop member 69 to thereby pivot switch lever 64 in a clockwise direction, as viewed in FIG. 3, for automatically stopping operation of electric motor 41.

When electric power means 41 is de-energized, there is still a slight amount of over travel by carriage 42 and it is often times desirable to instantaneously stop carriage 42 especially during the removal of the pelts around the head of the animal. To this end, I have provided a braking means operatively connected to the automatic control means whereby movement of carriage 42 is instantaneously stopped upon the de-energization of electric power means 41. A cam 72 is keyed to the small shaft which carries lever 64 and is swingable with switch lever 64 when moved to its various positions. An arm 73 is pivotally secured at 74 to plate 61 and has its underside constantly in contact with cam member 72. An elongated link 75 has its upper end connected to the outer end of arm 73 and its lower end connected to an arm 76 which in turn is fixed to a shaft 77. Referring now to FIG. 2, it will be seen that shaft 77 is disposed below and is substantially parallel with base plate 15. Shaft 77 is journalled in a bearing 78 secured to the underside of plate 15 and has a downwardly depending spring arm 79 fixed thereto. A spring member 80 has one end thereof secured to the lower end of arm 79 and has the other end thereof secured to a depending stud 81 secured to the underside of base plate 15. A brake arm 82 is fixedly secured to one end of shaft 77 and is rotatable therewith and is provided with a brake element 83 at one end thereof. Brake element 83, of course, may be formed of the same material as pulley 39. It will be noted from the drawings and from the above description spring 80 continually urges brake arm 82 and brake element 83 against pulley 39.

When switch lever 64 is in the position shown in FIG. 3, cam member 72 retains arm 73 in a somewhat elevated position which in turn acts through link 75, arm 76 and shaft 77 to rock brake arm 82 and brake element 83 away from pulley 40. Thus when switch lever 64 is in the position shown in FIG. 3, the carriage will move upwardly of elongated track member 26 and when lever arm 64 is pivoted in a clockwise direction, the opposite end of cam 72 will maintain arm 73 in an elevated position which in turn will cause brake arm 82 to be held away from pulley 40 and whereby carriage 42 will be moved outwardly. In the event that switch lever 64 is moved into a horizontal position, cam 72 will no longer sustain arm 73 in an elevated position and brake element 82 will be urged into engagement with belt 39 by spring 80 and carriage 42 will be instantaneously stopped because of the braking effect.

*Operation*

When skinning apparatus 10 is utilized to remove the pelt from an animal such as mink or the like, the animal must be preliminarily prepared as was described supra. A single continuous incision is made along the posterior portion of the rear legs and torso of the animal and extends from a point adjacent one rear paw to a point adjacent the other rear paw. The pelt is thereafter separated from the leg portions of the carcass by use of the separating tool 12 and clipper assembly 13. At this point a portion of the pelt adjacent the legs and hips of the animal has been detached from the carcass and hangs loose therefrom.

The pelt is now ready to be applied to the skinning apparatus 10 and carriage 42 is positioned adjacent retaining mechanism 17 whereby the notch 60 of gripping member 58 is in registering relation to notch 25 of retaining member 24. The tail or caudal appendage is wedged into recesses 25 and 60 with the carcass of the animal positioned above gripping member 58 while the pelt is positioned beneath retaining member 24. Switch lever 64 is pivoted to energize electric motor 41 whereby actuating screw is rotated in a direction to cause carriage 42 to move vertically upwardly of track bar 26. Since the carcass detached pelt portion of the animal adjacent the caudal appendage is retained by a retaining member 24, upward movement of the carriage 42 progressively removes the caudal appendage or tail from the pelt of the animal.

At this point the tail, rear legs and hip pelt portions of the animal have been detached from the carcass and the remaining pelt portion of the animal is removed in the following manner.

The animal is removed and the switch is actuated to thereby move the carriage 42 downwardly until it is again positioned adjacent the retaining mechanism 17.

The clamping mechanism 90 is then pivoted into an operative position closely adjacent the pelt end retaining mechanism 17 and the tail or caudal portion of the pelt is wound or wrapped around clamping arm 96 and clamped thereafter between clamping arms 96 and 97.

The pelt-exposed hip portions are wedged into recess 57 with the legs thereof positioned in recess 52a as shown in FIG. 1 of the drawings, and the carcass-detached paws of the pelt are wedged and retained within recesses 23 of retaining member 27.

When the carcass is so secured to carriage 42 and retaining member 17, switch lever 63 is pivoted in a direction to energize electric motor 41 whereby actuating screw 34 is rotated in a direction to move carriage 42 upwardly thereon. Upward movement of carriage 42 progressively removes or pulls the animal carcass from the pelt, as shown in FIG. 1 of the drawing. After the pelt has been removed from the carcass, switch control lever 63 is pivoted to reverse operation of electric motor means 41 whereby carriage 42 is returned to a position adjacent retaining mechanism 17. In the event the operator inadvertently fails to stop operation of the carriage 42 in its upward or downward movement, actuating bar 70 will engage stop 68 or 69 to thereby automatically shut off further operation of electric motor 41 and whereby brake element 83 will automatically engage belt 39 to instantaneously stop movement of carriage 42. It will also be understood that switch lever 64 may be manipulated by the operator to instantaneously stop upward and downward travel of carriage 42 at any selected point along its course of movement.

Thus it will be seen from the preceding paragraphs that I have provided a novel skinning apparatus for rapidly and effectively removing pelts from animals. From the foregoing description it will be apparent that an operator utilizing my novel skinning apparatus will be able to remove a much greater number of pelts as compared with the previously known manual method of pelt removing. It will also be noted that my apparatus is power operated and includes means for automatically stopping the device in the event of inadvertence of the operator to thereby prevent damage to the parts thereof.

It will, of course, be understood that various changes may be made in the form, details, arrangement and proportions of the parts without departing from the scope of the invention which consists of the matter shown and described herein and set forth in the appended claims.

What is claimed is:

1. Skinning apparatus for removing pelts from animals comprising a pelt-end retaining mechanism provided with a plurality of pelt-receiving recesses for receiving and retaining carcass-detached end portions of a pelt therein, an elongated member having a carriage connected in longitudinally shiftable relation thereto, said carriage being initially positioned adjacent said retaining mechanism and being provided with a carcass-gripping recess for retaining a pelt-exposed portion of an animal carcass therein, and power means for shifting said carriage away from said retaining mechanism whereby the pelt is progressively removed from the animal carcass.

2. Skinning apparatus for removing pelts from animals comprising a support, pelt-end retaining mechanism including a pair of elements secured to said support in spaced apart relation and each serving to secure one of the carcass-detached rear paws of a pelt thereto, an elongated member having a carriage slidably mounted thereon, said carriage being initially positioned adjacent said retaining mechanism and including a carcass-gripping mechanism for gripping a pelt-exposed hip portion of an animal carcass, actuating means cooperating with said carriage for sliding the same longitudinally of said elongated member, and power means for driving said actuating means whereby said carriage is moved away from said retaining mechanism to thereby progressively remove the pelt from the carcass.

3. The structure set forth in claim 2 wherein said actuating means includes an elongated threaded element.

4. The structure set forth in claim 2 and said retaining mechanism is provided with a retaining member having means for securing a carcass-detached portion of the pelt adjacent the caudal appendage thereto and said carriage is provided with a gripping member including means for gripping a pelt-exposed caudal portion of the carcass thereto whereby movement of said carriage away from said retaining mechanism progressively removes the pelt from the caudal appendage prior to removal of the entire pelt from the carcass.

5. Skinning apparatus for removing pelts from animals comprising a pelt-end retaining mechanism in the form of a pair of spaced apart upstanding members each of which is provided with a pelt-receiving recess for receiving and retaining a rear carcass-detached portion of a pelt therein, an elongated member interconnected in upstanding relation to said retaining mechanism and having a carriage slidably mounted thereon, said carriage being initially positioned adjacent said retaining mechanism and including a carcass-gripping recess for retaining a pelt-exposed portion of an animal carcass therein, actuating means cooperating with said carriage for sliding the same longitudinally of said elongated member and power means for driving said actuating means whereby said carriage is moved away from said retaining mechanism to thereby progressively remove the pelt from the carcass.

6. The structure set forth in claim 5 and a clamping mechanism for clamping and retaining the tail portion of a pelt thereto and shiftable from an operative position closely adjacent to an inoperative position substantially spaced from said pelt-end retaining mechanism.

7. The structure set forth in claim 5 and said retaining mechanism is provided with a retaining member having a recess for securing a carcass-detached portion of the pelt adjacent the caudal appendage therein and said carriage is provided with a gripping member having a recess for receiving a pelt-exposed caudal portion of the carcass therein whereby movement of said carriage away from said retaining member progressively removes the pelt from the caudal appendage prior to removal of the entire pelt from the carcass.

8. Skinning apparatus for removing pelts from animals comprising a pelt-end retaining mechanism including means for securing carcass-detached end portions of a pelt thereto, an elongated member having a carriage slidably mounted thereon, means rotatably mounting an elongated screw adjacent and substantially parallel to said elongated member, said carriage being initially positioned adjacent said retaining mechanism and including a carcass-gripping mechanism for gripping a pelt-exposed portion of an animal carcass, said carriage having a screw engaging element co-acting with said screw, power means interconnected to said screw for rotating the same whereby said screw serves to guide and to drive said carriage away from said retaining mechanism to thereby progressively remove the pelt from the carcass.

9. Skinning apparatus for removing pelts from animals comprising a pelt-end retaining mechanism including means for securing carcass-detaching end portions of a pelt thereto, an elongated member having a carriage slidably mounted thereon, said carriage being initially positioned adjacent said retaining mechanism and including a carcass-gripping mechanism for gripping a pelt-exposed portion of an animal carcass, an actuating screw cooperating with said carriage for shifting the same longitudinally of said elongated member, power means for driving said actuating screw whereby said carriage is moved away from said retaining mechanism to thereby progressively remove the pelt from the carcass, and an automatic control mechanism operatively connected to said power means and actuated by said carriage for limiting longitudinal movement of said carriage beyond predetermined points of said elongated member.

10. The structure set forth in claim 8 wherein said power means is reversible to permit said carriage to be moved towards and away from said retaining mechanism.

11. Skinning apparatus for removing pelts from animals comprising a pelt-end retaining mechanism including means for securing carcass-attached end portions of pelts thereto, an elongated member having a carriage slidably mounted thereon, said carriage including a carcass-gripping mechanism for gripping a pelt-exposed portion of an animal thereto, an actuating screw cooperatively engaging said carriage for shifting the same longitudinally of said elongated member, reversible electric power means for supplying rotative motion to said actuating screw, means interconnecting said power means and said actuating screw whereby said carriage is caused to be moved toward and away from said retaining mechanism when said power means is energized and an automatic control mechanism operatively connected to said power means and actuated by said carriage for limiting longitudinal movement of said carriage beyond predetermined points of said elongated member.

12. The structure as defined in claim 11 and brake means actuated by said control mechanism and engageable with said interconnecting means when said electric power means is de-energized to thereby instantaneously stop movement of said carriage.

References Cited in the file of this patent

UNITED STATES PATENTS 2,642,619    Coad _____ June 23, 1953